F. B. CONVERSE.
METHOD OF MAKING TIRE CASINGS.
APPLICATION FILED SEPT. 17, 1920.
1,420,623.
Patented June 27, 1922.
2 SHEETS—SHEET 1.
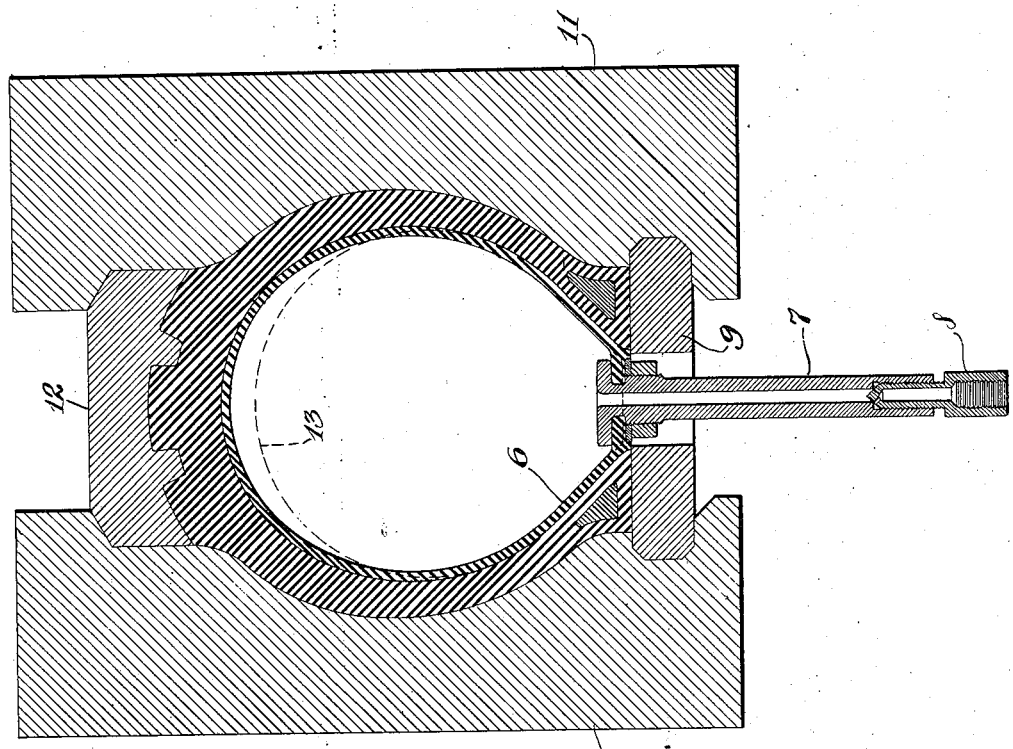
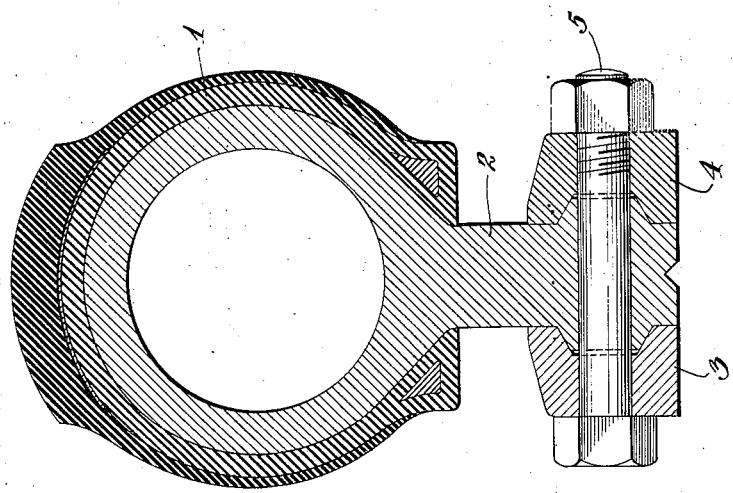
INVENTOR
Francis B. Converse
BY
Riddell & Marqueen
ATTORNEYS F. B. CONVERSE.
METHOD OF MAKING TIRE CASINGS.
APPLICATION FILED SEPT. 17, 1920.
1,420,623.
Patented June 27, 1922.
2 SHEETS—SHEET 2.
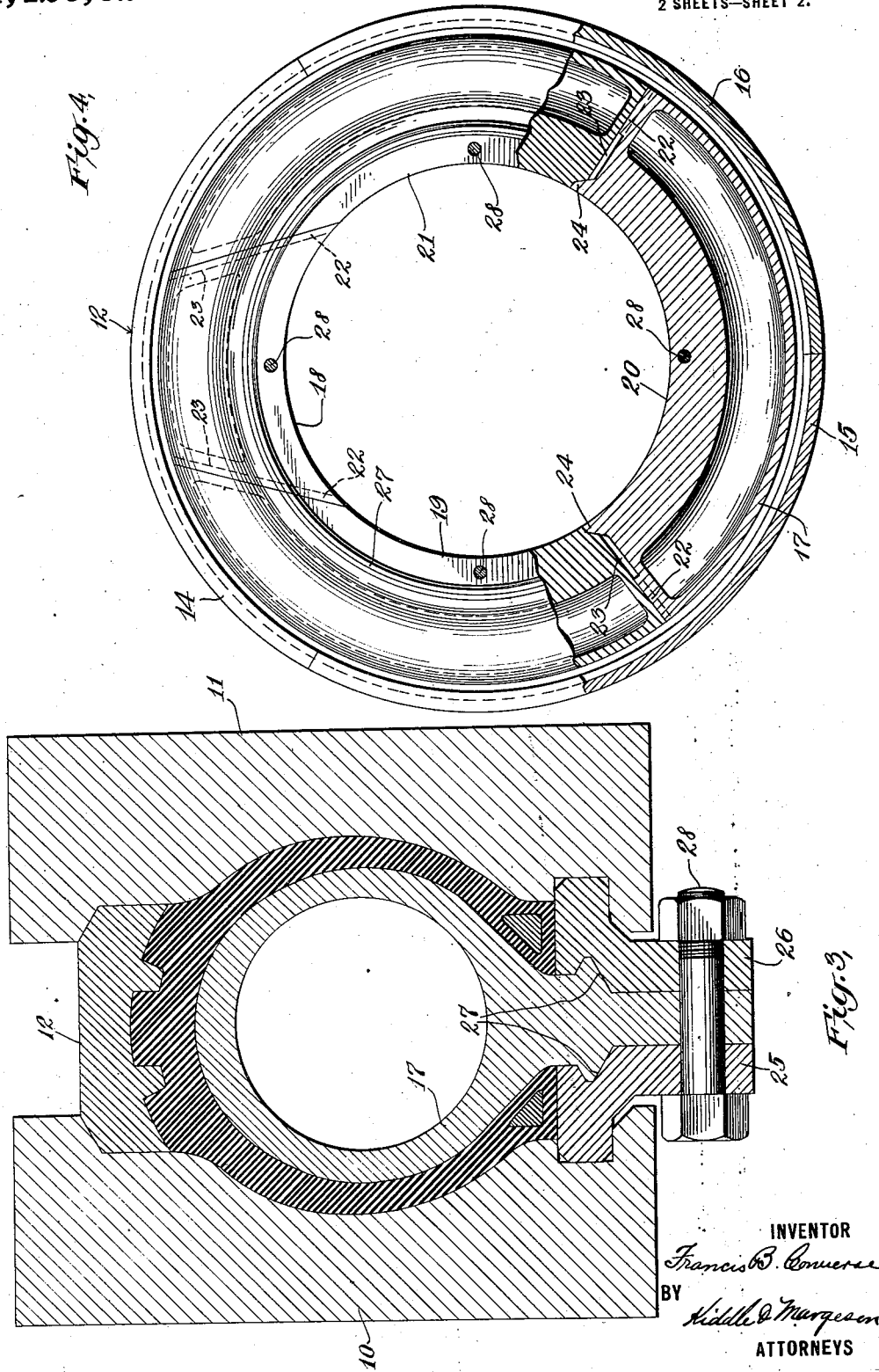
INVENTOR
Francis B. Converse
BY
Liddle & Margeson
ATTORNEYS

UNITED STATES PATENT OFFICE.

FRANCIS B. CONVERSE, OF NORWALK, CONNECTICUT, ASSIGNOR TO THE NORWALK TIRE AND RUBBER COMPANY, OF NORWALK, CONNECTICUT, A CORPORATION OF CONNECTICUT.

METHOD OF MAKING TIRE CASINGS.

1,420,623.   Specification of Letters Patent.   Patented June 27, 1922.

Application filed September 17, 1920. Serial No. 410,889.

*To all whom it may concern:*

Be it known that I, FRANCIS B. CONVERSE, a citizen of the United States, and a resident of Norwalk, in the county of Fairfield and State of Connecticut, have invented certain new and useful Improvements in Methods of Making Tire Casings, of which the following is a specification.

My invention relates to the method of making tire casings.

Heretofore, in the manufacture of automobile pneumatic tires, particularly of the cord type, it has been found advantageous to expand the unvulcanized tire casing outwardly against the mold rather than to compress the tire by mold pressure inwardly against a solid core in order to avoid the possibility of wrinkling or buckling the fabric in the carcass, to straighten out any irregularities in the positioning of the cords and to bring the various cords to an equal length and tension in the finished tire.

In carrying out said process, the unvulcanized tire casing, after it has been completely built up, is removed from the core or former on which it was built; then an inflatable tube of rubber or rubberized fabric is inserted in the casing and after enclosing the casing in an iron mold, the cavity of which is larger than the tire casing, the tire casing is expanded to the limits of the mold by forcing air or water under pressure into the inner tube. The mold with the casing and the included tube under fluid pressure is then subjected to the necessary vulcanizing heat.

This method or practice, however, entails large expense by reason of the destruction of the inflatable tube during vulcanization. If this tube is made of thin rubber, it is generally destroyed in the vulcanization of a single tire; if made of rubberized fabric, its life may be greater but its cost is greater than a tube of thin rubber. Moreover, the heavier rubberized fabric tube takes a permanent set after it has been used a number of times, resulting in the tube becoming too large for the tire cavity. The further use of such enlarged tube results in the production of wrinkles or buckles in the wall of the tube which are reproduced in the interior wall of the tire, thereby rendering the tire unfit for use. Moreover, if the tube is defective either from use or as originally made, so that the pressure in the tire during vulcanization cannot be maintained, the tire will be rendered defective or completely worthless.

One of the objects of the present invention is to provide a method of manufacturing tires, whereby an inflatable or expansible tube is used only for stretching the tire, and a metal core of the size of the expanded tire is then substituted for the tube, thereby avoiding the expense incident to the use of tubes, and to their occasional failure during vulcanization.

Other objects of my invention will appear from the detailed description of my method hereinafter set forth.

Inasmuch as my method contemplates the use of certain instrumentalities, it can be best described with reference to said instrumentalities illustrated on the accompanying drawings, in which—

Figure 1 is a cross-section through a collapsible core of the usual form in general use with a built-up tire thereon.

Figure 2 is a cross-section of a mold in which the unvulcanized tire is expanded.

Figure 3 is a cross-section of a mold with the expanded tire on a core in place therein, ready for vulcanization.

Figure 4 is a plan view, partly in section, of the core used during vulcanization, and the tread ring in position relative thereto.

The tire structure 1 is built complete upon the core 2, as is the general practice. The core 2 may be of any acceptable form, and is collapsible, so that it may be removed from the tire after it is built. The core is preferably constructed of three or more segments parted on radial or approximately radial lines, the segments being secured together into a complete ring by the two solid rings 3 and 4 fastened together by bolts 5.

After the removal of the core 2, an inflatable or expansible tube 6 is then inserted in the tire. An inner tube such as is generally used in pneumatic tires, is excellently adapted to this purpose. The inner tube is provided with an air valve 7 of any desired form, having a screw connection 8 for attachment to a source of fluid (preferably air) pressure.

The tire 1 with contained tube 6 is then mounted on a metal ring 9 which fits the interior diameter of the tire bead. The ring 9 for convenience of mounting may be made in two pieces, one division being at the hole through which the valve stem projects, and the other at the opposite side of the ring.

The tire 1, tube 6, and ring 9 are then secured in a mold which consists of two cast-iron portions 10 and 11, and a tread ring 12. The portions 10 and 11 have formed in them the mold cavity for the sides of the tire, the cavity being larger than the tires as built in order to permit of a predetermined percentage of expansion of the tire.

The tread ring 12 has formed upon it the relief features of a non-skid tread. As illustrated, the tread is the familiar grooved tread having two grooves extending around the tire periphery.

The mold portions are firmly clamped together by any desirable means, preferably by a hydraulic press in the manner familiar in the art, and while so clamped air is admitted to the inner tube under sufficient pressure to completely expand the tire to the limit of the mold cavity. The original size of the interior wall of the unexpanded tire is indicated in Figure 2 by the broken line 13. The rubber of the tread is formed to the tread design by the pressure within the tire forcing the tread against the tread ring 12. The tire may be left under this expanding pressure for a few minutes, when the mold is opened and the tire removed. The bead ring 9 and the inner tube 6 are then removed. If the tread ring 12 is a continuous ring, it would remain upon the tire. I prefer, however, to make this ring in three sections as indicated at 14, 15 and 16 in Figure 4, in which case it is removed.

The stretched tire is now mounted on a metal core 17 which is of such size as to completely fill the expanded tire. This core is made of four segments 18, 19, 20 and 21, the division between the segments 19 and 20, and 20 and 21 being radial. The segment 18 is wedge-shaped, and tongue and groove connections 22 and 23 align the segments in a common plane.

To assemble the core within the tire the segment 20 is placed in the tire cavity. The segments 19 and 21 are added adjacent thereto and then the wedge segment 18 is forced into place. The wedge-shaped projections 24 on the segment 20 align the segments 19 and 21 circumferentially. Bead rings 25 and 26 are then mounted within the interior diameter of the tire bead, the tapered projections 27 on the core serving to align all the parts concentrically. Bolts 28 may be used to hold the structure together during subsequent handling. The tread ring segments 12 are replaced upon the tread of the tire, and the whole structure placed within the mold, whch is clamped firmly together, preferably by the hydraulic ram provided in the vulcanizer, as generally used. The tire is then vulcanized in accordance with the general practice.

In making plain tread tires—that is, tires having treads without the relief features of the non-skid design—the tread ring 12 may be omitted, the mold halves being made to completely include the tread. In the manufacture of non-skid tires, instead of having the tread design formed in the mold halves, it is desirable to use the tread ring having the relief features of the tread formed therein, owing to the difficulty of removing the tire from a mold and thereafter replacing it in the mold with the solid core inside, without defacing or destroying the tread if the tread design is formed in the mold halves. The full features of the tread are formed on the tire as completely as possible under the fluid pressure, in order that there shall be the least possible movement of material in the tire when subjected to the pressure of the mold and interior solid core.

Instead of using the metal core 17 on which to vulcanize the tire, I may use a rubberized fabric core of substantial construction with fluid pressure applied therein. This core is made to fit the tire cavity after the tire has been expanded, and it does not therefore stretch. The tendency of such a tube to buckle or wrinkle by being too large for the tire into which it is inserted is thereby avoided and the life of the tube is greatly increased.

In practice I prefer to use a mold in which the unvulcanized tire is expanded, that is somewhat larger than the vulcanizing mold and is without the usual engraved lettering that molds are usually provided with to form the trade-mark, size designation, etc., on the tire exterior. It is desirable to slightly overexpand the tire to allow for such contraction in the structure as results when the pressure is released. This permits the full-size vulcanizing core to be more easily inserted in the casing.

By the method hereinbefore described, inflatable inner tubes are preferably used only for expanding the unvulcanized tires, and the cost incident to the use of the tube during vulcanization is thereby avoided. But if it be desired to use a tube during the vulcanizing period, the life of such tube is greatly increased if it is not required to stretch beyond its normal size during vulcanization thereby avoiding the tendency to increase permanently in size and cause its failure by the formation of buckles as hereinbefore pointed out.

What I claim is:

1. The method of making tire casings, which method consists in forming an unvulcanized casing structure subjecting said casing to fluid pressure to expand the same, then inserting a core in said casing to maintain it in its expanded condition, and then vulcanizing.

2. The method of making tire casings, which method consists in forming an unvulcanized casing structure, expanding the casing, thereafter inserting a core in said casing to maintain it in its expanded condition, and vulcanizing while so expanded.

3. The method of making pneumatic tire casings, which method consists in forming a suitable casing structure, inserting an expansible member in said casing, mounting said casing in a mold, expanding said expansible member to cause said casing to fill said mold, removing said mold and said expansible member and inserting in said casing a core of a size to maintain the casing expanded, and then vulcanizing.

4. The method of making pneumatic tire casings, which method consists in forming an unvulcanized casing structure, mounting said casing with an expansible member therein in a mold larger than said casing subjecting said expansible member to fluid pressure to cause said casing to expand to fill the mold, removing said mold and said expansible member, inserting in said casing a suitable core to maintain said casing in its expanded condition, and then vulcanizing.

5. The method of making pneumatic tire casings, which method consists in forming a complete unvulcanizing casing structure, inserting an expansible inner tube in said casing, mounting said casing in a mold larger than said casing, subjecting said inner tube to a suitable fluid pressure to cause said casing to completely fill said mold, removing said mold and inner tube, inserting a metal core in said casing to maintain it in its expanded condition, and then vulcanizing.

6. The method of making pneumatic tire casings, which method consists in forming a complete unvulcanized casing structure, inserting an expansible inner tube in said casing, mounting said casing in a mold larger than said casing, subjecting said inner tube to a suitable fluid pressure to cause said casing to completely fill said mold, removing said mold and inner tube from said casing, inserting a metal core in said casing to maintain it in its expanded condition, placing said casing and core in a suitable mold, and then vulcanizing.

7. The method of making pneumatic tire casings, which method consists in constructing an unvulcanized casing structure, inserting an expansible inner tube in said casing mounting said casing in a mold larger than said casing, admitting sufficient fluid under pressure to said inner tube to expand said casing, removing the mold and inner tube from said casing, mounting the stretched casing upon a core of sufficient size to completely fill the tire cavity, placing the casing with said core, in a suitable mold, and then vulcanizing.

8. The method of making tire casings which method consists in forming an unvulcanized casing structure, inserting an expansible member in the casing, mounting said casing in a mold having a separable portion to form the tread of the tire, expanding said expansible member to cause said casing to fill said mold and to form the tread, removing said mold and said expansible member and inserting in the casing a suitable core to maintain the casing in its expanded condition and then vulcanizing the tire.

9. The method of making tire casings which consists in forming an unvulcanized casing structure, inserting an expansible member in the casing, mounting said casing in a mold having the tread design formed on a separable ring made in sections, expanding said expansible member to cause said casing to fill said mold and to form the tread, removing the casing from the mold and tread ring, substituting a core for the expansible member, replacing the tread ring sections, inserting in a vulcanizing mold and then vulcanizing the tire.

This specification signed this 11th day of Sept., 1920.

FRANCIS B. CONVERSE.